(12) United States Patent
Kashiwagi et al.

(10) Patent No.: US 7,804,633 B2
(45) Date of Patent: *Sep. 28, 2010

(54) HOLOGRAM RECORDING FILM WITH ADDITIONAL INFORMATION AND RECORDING METHOD THEREFOR

(75) Inventors: Tsuyoshi Kashiwagi, Tokyo (JP); Daijiro Kodama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/197,268

(22) Filed: Jul. 18, 2002

(65) Prior Publication Data

US 2003/0016408 A1    Jan. 23, 2003

(30) Foreign Application Priority Data

Jul. 18, 2001 (JP) ............................. 2001-217684

(51) Int. Cl.
*G03H 1/22* (2006.01)
*G03H 1/04* (2006.01)
(52) U.S. Cl. ............................. 359/32; 359/24; 359/35
(58) Field of Classification Search .................... 359/1, 359/2, 12, 24, 32, 33, 15, 25, 20, 22, 567, 359/569, 35; 430/1, 2; 283/86
See application file for complete search history.

(56) References Cited

U.S. PATENT DOCUMENTS

| | | | | |
|---|---|---|---|---|
| 4,420,218 A * | 12/1983 | Rubanov et al. | ............... | 359/24 |
| 4,999,234 A * | 3/1991 | Cowan | ...................... | 428/156 |
| 5,310,222 A * | 5/1994 | Chatwin et al. | ................ | 283/86 |
| 5,956,164 A * | 9/1999 | Waitts | ............................ | 359/2 |
| 6,613,481 B2 * | 9/2003 | Hamada | ......................... | 430/1 |
| 6,646,771 B2 * | 11/2003 | Stevenson | ....................... | 359/2 |
| 6,728,014 B2 * | 4/2004 | Kodama | ........................ | 359/12 |
| 7,154,647 B1 * | 12/2006 | Takabayashi et al. | .......... | 359/15 |

* cited by examiner

*Primary Examiner*—Audrey Y Chang
(74) *Attorney, Agent, or Firm*—Sughrue Mion, PLLC (57) ABSTRACT

A hologram recording film has an image of a three-dimensional object, e.g. a three-dimensional model, recorded in a volume hologram photosensitive material and further has a hologram image of a plane color pattern, e.g. a character or an image, together with the shadow of the color pattern, recorded as individual information in a superimposed manner in the same photosensitive material without using a liquid crystal display. Pieces of plane additional information of the same pattern have been recorded so as to be capable of being reconstructed simultaneously in a hologram plane and in front of or behind the hologram plane, respectively, in superimposition with a reconstructed image from a volume hologram.

12 Claims, 4 Drawing Sheets

HOLOGRAM RECORDING FILM WITH ADDITIONAL INFORMATION AND RECORDING METHOD THEREFOR

BACKGROUND OF THE INVENTION

The present invention relates to a hologram recording film with additional information and also pertains to a recording method therefor. More particularly, the present invention relates to a hologram recording film having a reflection type volume hologram of a three-dimensional object or the like recorded therein, together with a plane pattern, e.g. a character or an image, recorded in superimposition with the volume hologram as individual information (variable information) concerning the associated hologram. The present invention also relates to a recording method for the hologram recording film.

To record a reflection type volume hologram, a volume hologram photosensitive material, e.g. a photopolymer, is placed in close contact with or in close proximity to a reflection type volume hologram original plate for duplication, and illuminating light for duplication is applied from the hologram photosensitive material side so that reflected and diffracted light from the reflection type volume hologram original plate and the incident light interfere with each other in the hologram photosensitive material, thereby duplicatively recording a reflection type volume hologram having the same characteristics as those of the reflection type volume hologram original plate. To add variable information, e.g. a serial number, to each individual hologram made by holographic duplication, some methods have heretofore been proposed. For example, Japanese Patent Application No. Hei 10-56470 discloses a method wherein a reflection mask using a reflection type liquid crystal display is provided in the vicinity of a hologram on a hologram original plate that is to be duplicated, and additional information corresponding to a reflection pattern of the reflection mask is recorded on a hologram photosensitive material at the same time as the hologram to be duplicated is recorded. In addition, Japanese Patent Application No. Hei 10-56470 discloses a method wherein a reflection region is provided on a hologram original plate in the vicinity of a hologram to be duplicated, and light is applied to the reflection region through a transmission mask using a transmission type liquid crystal display to record additional information corresponding to a transmission pattern of the transmission mask on a hologram photosensitive material simultaneously with the hologram.

Japanese Patent Application No. 2000-4617 proposes a recording method wherein when a hologram is to be recorded by duplication from a reflection type hologram original plate, a character hologram plate for reproducing a color pattern, e.g. a character or an image, is placed between a volume hologram photosensitive material and the reflection type hologram original plate, thereby duplicatively recording a reflection type volume hologram having a color pattern, e.g. a character or an image, together with the shadow thereof, recorded therein simultaneously.

The method proposed in the above-described Japanese Patent Application No. Hei 10-56470, in which individual information or variable information displayed on a liquid crystal display is recorded in a superimposed manner, needs to place the liquid crystal display by the side of or over the hologram original plate. This causes the system to be unfavorably complicated. Further, individual information or variable information is recorded on the basis of the pixels of the liquid crystal display, and the additional information is expressed in the form of a set of pixels. Therefore, the proposed method is inferior in the graphical design function of the hologram. Furthermore, the additional information recorded in a superimposed manner is a simple plane pattern and hence cannot cast a shadow or the like. Thus, the conventional method is inferior in expressional capability as well.

Japanese Patent Application No. 2000-4617 allows a color pattern, e.g. a character, together with the shadow thereof, to be recorded simultaneously and hence provides abundant expressional capability. However, the additional information is limited to the pattern recorded on the character hologram plate. Therefore, it is difficult to record variable information, e.g. a serial number, for each individual hologram made by holographic duplication. Further, the color pattern, e.g. character, and the shadow thereof are in a complementary color relation to each other. Accordingly, it has heretofore been impossible to record the shadow of the same color as that of the color pattern.

SUMMARY OF THE INVENTION

The present invention was made in view of the above-described circumstances of the prior art.

An object of the present invention is to provide a hologram recording film having an image of a three-dimensional object, e.g. a three-dimensional model, recorded in a volume hologram photosensitive material and further having a hologram image of a plane color pattern, e.g. a character or an image, together with the shadow of the color pattern, recorded as individual information in a superimposed manner in the same volume hologram photosensitive material without using a liquid crystal display, and also provide a recording method for the hologram recording film.

To attain the above-described object, the present invention provides a hologram recording film with additional information. The hologram recording film has a reflection type volume hologram recorded therein. Pieces of plane additional information of the same pattern have been recorded in the hologram recording film in superimposition with the volume hologram so that the pieces of plane additional information can be reconstructed simultaneously in a hologram plane and in front of or behind the hologram plane, respectively, in superimposition with a reconstructed image from the volume hologram.

In this case, it is desirable that the volume hologram should be a hologram recorded with a single wavelength or with two or more wavelengths.

Further, it is desirable that the pieces of plane additional information should have been recorded so as to be capable of being reconstructed as a color pattern.

Further, it is desirable that the pieces of plane additional information should have been recorded so as to be capable of being reconstructed in the same color.

In addition, the present invention provides a recording method for a hologram recording film with additional information. According to the recording method, a hologram photosensitive material is placed at a distance from a reflection type volume hologram original plate for forming an object image. A transparent sheet having a plane additional information pattern recorded thereon is placed at the side of the hologram photosensitive material remote from the reflection type volume hologram original plate. Duplicating illuminating light for duplicating the reflection type volume hologram original plate is applied from the transparent sheet side so that diffracted light from the reflection type volume hologram original plate and the duplicating illuminating light interfere with each other in the hologram photosensitive material, thereby recording a reflection type volume hologram with additional information in the hologram photosensitive material.

In this case, it is desirable that the transparent sheet should be a transparent protective sheet for protecting the hologram photosensitive material, and the plane additional information pattern should be recorded on the transparent protective sheet by using a laser marker, an ink-jet printer, sublimation transfer, printing, or an electrophotographic system such as a laser printer.

In the present invention, pieces of plane additional information of the same pattern are recorded so as to be capable of being reconstructed simultaneously in the hologram plane and in front of or behind the hologram plane, respectively, in superimposition with a reconstructed image from a volume hologram. Therefore, the additional information can be obtained as a latent image of excellent visibility under a spotlight, although it may suffer poor visibility and become a blurred image under a fluorescent light. The present invention allows different additional information to be recorded in a superimposed manner for each hologram as individual information without the need of revising the original plate and with a simple setup requiring no special change in the setup used for the conventional hologram duplicating method and no special equipment, without the need of a special additional step for the recording process.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The hologram recording film with additional information and the recording method therefor according to the present invention will be described below with reference to the accompanying drawings.

Figure 1:
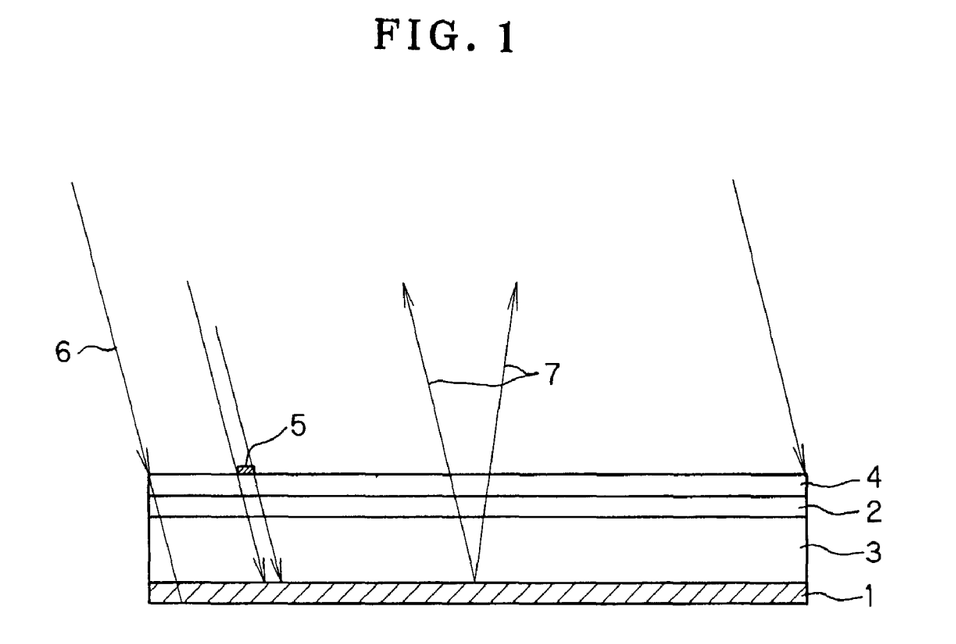
FIG. 1 is a diagram showing a basic setup for adding variable information to each individual reflection type volume hologram when duplicatively recorded from a reflection type volume hologram original plate according to the present invention.

FIG. 1 is a diagram showing a basic setup for adding variable information, e.g. a serial number, to each individual reflection type volume hologram when duplicatively recorded from a reflection type volume hologram original plate according to the present invention, the volume hologram having approximately the same characteristics as those of the original plate. In the figure, reference numeral 1 denotes a reflection type volume hologram original plate wherein an image of a three-dimensional object, e.g. a three-dimensional model, has been recorded holographically. The reflection type volume hologram original plate 1 has a transparent plate 3 with a predetermined thickness laminated thereon. A volume hologram photosensitive material 2, e.g. a photopolymer, is laminated on the transparent plate 3. The volume hologram photosensitive material 2 has a transparent protective sheet 4 laminated on the surface thereof. Variable information 5, e.g. a serial number, is written on an appropriate position of the surface of the transparent protective sheet 4.

The variable information 5 may be any information that is recorded by a means capable of writing a color or black-and-white pattern, e.g. a character or an image, such as a laser marker, an ink-jet printer, sublimation transfer, printing, or an electrophotographic system such as a laser printer.

With this setup, duplicating illuminating light 6 of three colors, i.e. R (red), G (green) and B (blue), is made incident simultaneously or successively in a desired order from the volume hologram photosensitive material 2 side in a direction opposite to the direction of incidence of illuminating light at the time of making the reflection type volume hologram original plate 1 in the same way as in the conventional method of duplicatively recording a reflection hologram. The duplicating illuminating light 6 passes through the transparent protective sheet 4, the volume hologram photosensitive material 2 and the transparent plate 3 while passing through the variable information 5 on the transparent protective sheet 4 and is incident on the reflection type volume hologram original plate 1. Consequently, diffracted light 7 is produced in the reflection direction from the reflection type volume hologram original plate 1. The reflected and diffracted light 7 and the incident light (duplicating illuminating light) 6 interfere with each other in the volume hologram photosensitive material 2, whereby a reflection type volume hologram having approximately the same characteristics as those of the reflection type volume hologram original plate 1 is duplicatively recorded in the volume hologram photosensitive material 2. At this time, the variable information 5 recorded on the surface of the transparent protective sheet 4 is simultaneously recorded in the volume hologram photosensitive material 2 holographically in a superimposed manner. After the duplicative recording process, the volume hologram photosensitive material 2 is delaminated from the transparent plate 3, and the transparent protective sheet 4 is separated from the volume hologram photosensitive material 2, thereby obtaining a hologram recording film with additional information according to the present invention.

The additional information recorded in the volume hologram photosensitive material 2 in a superimposed manner is accompanied by the shadow of the same color as that of light passing through the variable information 5 and hence exhibits a superior graphical design function and high expressional capability. Moreover, as will be clear from the setup shown in FIG. 1, the additional information can be recorded with a simple setup requiring no special change in the setup used for the conventional hologram duplicating method and no special equipment, without the need of a special additional step for the recording process.

The following is a description of the form of additional information recorded in the volume hologram photosensitive material 2 in a superimposed manner, together with an image of a three-dimensional object duplicatively recorded therein.

Figure 2:
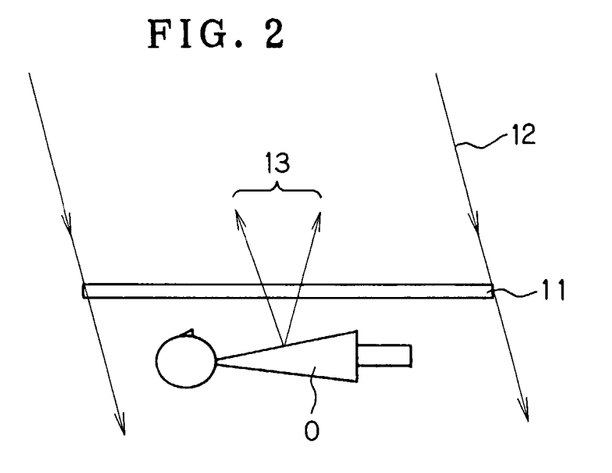
FIG. 2 is a diagram showing a setup used when a reflection type volume hologram original plate is recorded in the form of a Denisyuk hologram.

FIG. 2 is a diagram showing a setup used when the reflection type volume hologram original plate 1 is recorded in the form of a Denisyuk hologram. A three-dimensional object O, e.g. a three-dimensional model, is prepared, and a volume hologram photosensitive material 11 is placed at a certain distance therefrom. In this case, a volume hologram photosensitive material sensitive to three colors, i.e. R, G, and B, and capable of recording a hologram in a superimposed manner is used as the volume hologram photosensitive material 11. However, it is also possible to use a volume hologram photosensitive material having a three-layer structure formed by stacking up photosensitive layers sensitive to the three colors, i.e. R, G, and B, respectively. With this setup, illuminating light 12 of three colors, i.e. R, G, and B, is made incident simultaneously or successively in a desired order from the volume hologram photosensitive material 11 side at a predetermined incident angle. Consequently, the illuminating light 12 passes through the volume hologram photosensitive material 11 and is incident on the three-dimensional object O. As a result, scattered light 13 is produced in the reflection direction from the object O. The scattered light 13 and the illuminating light 12 interfere with each other in the volume hologram photosensitive material 11, whereby a full-color reflection hologram 1 of the three-dimensional object O is recorded in the volume hologram photosensitive material 11. The reflection hologram 1 is used as the reflection type volume hologram original plate 1 (see FIGS. 1 and 3).

Figure 3:
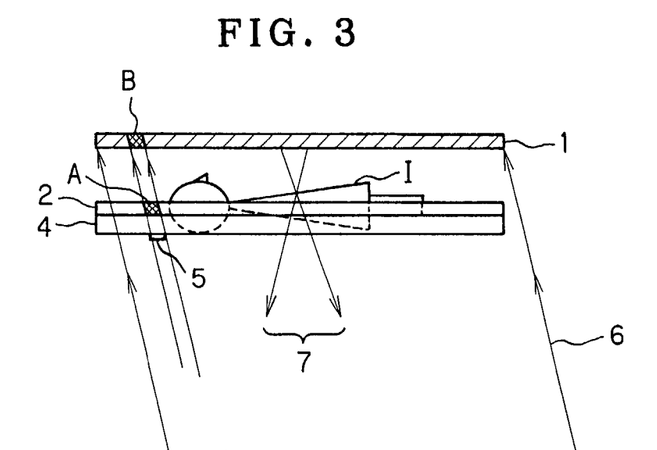
FIG. 3 is a diagram showing an optical path when a reflection type volume hologram original plate recorded by the setup as shown in FIG. 2 is duplicated, together with variable information, by the setup as shown in FIG. 1.

FIG. 3 is a diagram showing an optical path when the reflection type volume hologram original plate 1 recorded by the setup as shown in FIG. 2 is duplicated, together with the variable information 5, by the setup as shown in FIG. 1. The setup shown in FIG. 3 is upside-down in relation to the setup shown in FIG. 1. Illustration of the transparent plate 3 is omitted in FIG. 3. Duplicating illuminating light 6 is made incident on the reflection type volume hologram original plate 1 through the transparent protective sheet 4 and the volume hologram photosensitive material 2 from a direction opposite to the direction of incidence of the illuminating light 12 at the time of making the reflection type volume hologram original plate 1 shown in FIG. 2. Consequently, an image I of the three-dimensional object O (an image of only the front of the object O) is formed at the position of the object O at the time of recording the reflection type volume hologram original plate 1 by reflected and diffracted light 7 from the reflection type volume hologram original plate 1. The diffracted light 7 forming the image I of the object O and the incident light (duplicating illuminating light) 6 interfere with each other in the volume hologram photosensitive material 2, whereby a reflection type volume hologram having approximately the same characteristics as those of the reflection type volume hologram original plate 1 is duplicatively recorded in the volume hologram photosensitive material 2.

Assuming that the variable information 5 on the transparent protective sheet 4 has been recorded with a transparent ink that transmits only red light, for example, (it is a matter of course that the variable information 5 may be formed to transmit light of other color or may be black so as not to transmit color), only red light in the illuminating light 6 passes through the portion containing the variable information 5. Hence, only the red light in the illuminating light 6 is incident on a region A of the volume hologram photosensitive material 2 that is shadowed by the variable information 5 and also incident on a region B of the reflection type volume hologram original plate 1 that is shadowed by the variable information 5. Not only red light but also green light and blue light are usually incident on the other regions of the volume hologram photosensitive material 2 and the reflection type volume hologram original plate 1. Accordingly, only red light is diffracted from the region B of the reflection type volume hologram original plate 1, and only interference fringes of red light are recorded in the region A of the volume hologram photosensitive material 2. In contrast, ordinary red, green and blue light forming the image I is diffracted from the regions other than the region B of reflection type volume hologram original plate 1. Interference fringes of ordinary red, green and blue light forming the image I are recorded in the regions other than the region A of the volume hologram photosensitive material 2.

Figure 4:
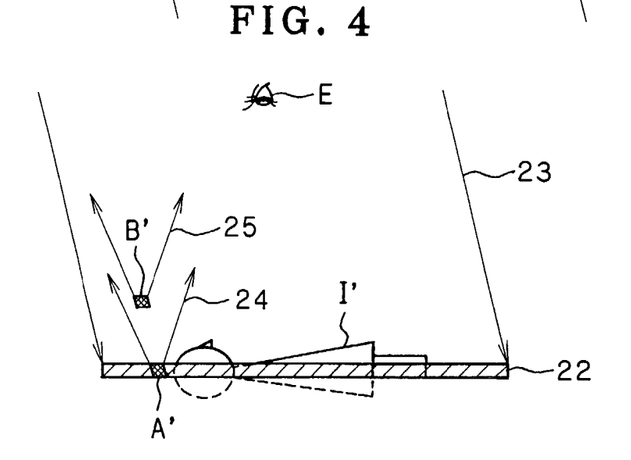
FIG. 4 is a diagram showing an optical path when a recorded image is reconstructed from a volume hologram duplicatively recorded by the setup as shown in FIG. 3.

FIG. 4 is a diagram showing an optical path when a recorded image is reconstructed from a volume hologram 22 duplicatively recorded in the volume hologram photosensitive material 2 as illustrated in FIG. 3 (FIG. 1). White illuminating light 23 is made incident on the volume hologram 22 from a direction opposite to the direction of incidence of the duplicating illuminating light 6 at the time of the duplicative recording. Consequently, diffracted light reconstructs an image I' of the image I of the three-dimensional object O (an image of only the front of the object O) in the vicinity of the plane of the volume hologram 22. In addition, because only interference fringes of red light have been recorded in a region A' of the volume hologram 22 corresponding to the region A shown in FIG. 3, the region A', which has the same pattern as that of the variable information 5, diffracts only red diffracted light 24. The diffracted light 24 is seen to an observer's eye E as a red first additional information pattern A'. On the other hand, only red diffracted light from the volume hologram 22 enters a space region B' in front of the volume hologram 22, which corresponds to the region B of the reflection type volume hologram original plate 1 shown in FIG. 3. Therefore, only red diffracted light 25 emerges from the space region B', which has the same pattern as that of the variable information 5. The diffracted light 25 is seen to the observer's eye E as a red second additional information pattern B'. The first and second additional information patterns A' and B' of the same color are seen to be spatially fixed. Therefore, the relative positions of the two additional information patterns A' and B' change as the eye E moves.

The setup shown in FIG. 3 is arranged to record a reflection type volume hologram so that the additional information patterns A' and B' are seen in superimposition with each other in a case where the front surface of the image I of the object O reconstructed from the reflection type volume hologram original plate 1 faces toward the original plate 1. In the following embodiment, the present invention will be described with regard to a case where the front surface of the image I' of the object O reconstructed from the reflection type volume hologram original plate 1 faces away from the original plate 1.

Figure 5A:
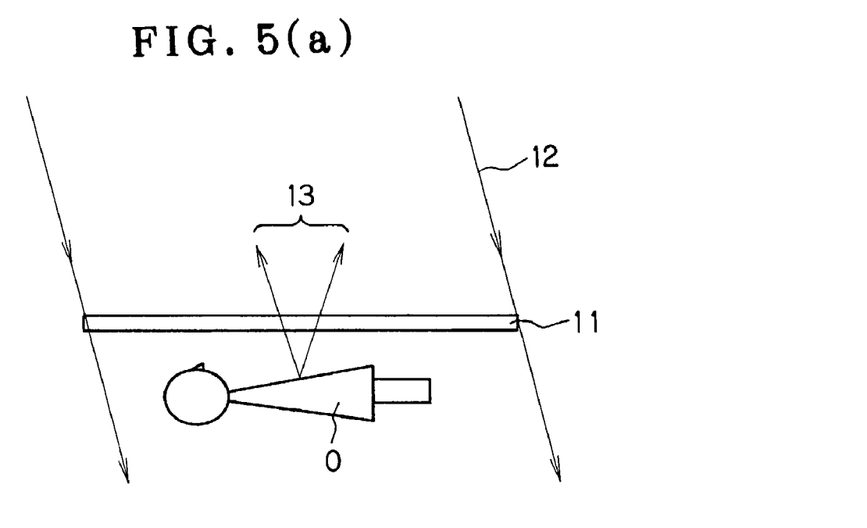
FIGS. 5(a), (b) and (c) are diagrams for illustrating an example of a method of recording a reflection type volume hologram original plate used in another embodiment.
Figure 5B:
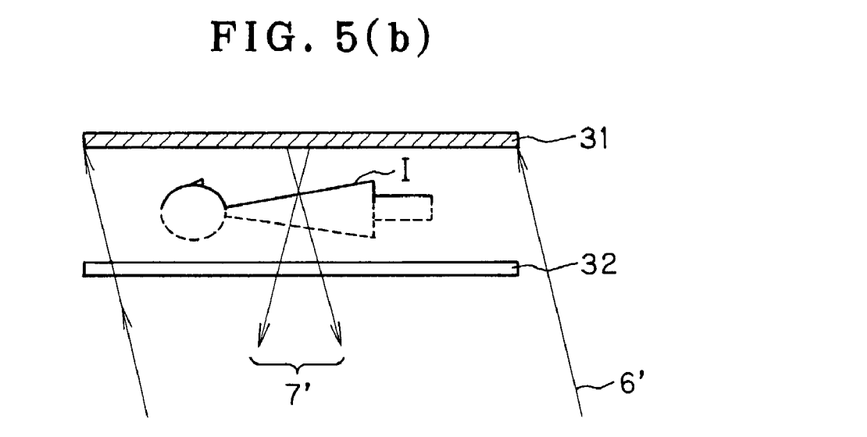

FIGS. 5(a), (b) and (c) are diagrams for illustrating an example of a method of recording the reflection type volume hologram original plate 1 as stated above. In FIG. 5(*a*), a volume hologram photosensitive material 11 is placed at a certain distance from an object O, and illuminating light 12 is made incident from the volume hologram photosensitive material 11 side at a predetermined incident angle in the same way as in FIG. 2. Scattered light 13 from the object O and the illuminating light 12 are allowed to interfere with each other in the volume hologram photosensitive material 11, thereby recording a full-color reflection hologram 31 of the three-dimensional object O [see FIG. 5(*b*)].

Figure 5C:
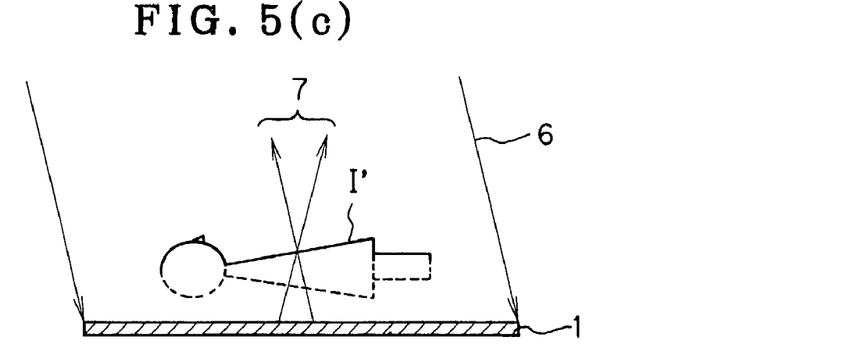

With the reflection hologram 31 used as an intermediate hologram original plate, a reflection type volume hologram original plate 1 is recorded by the setup shown in FIG. 5(*b*). To effect recording, as shown in FIG. 5(*b*), a volume hologram photosensitive material 32 is placed at the side of the three-dimensional object O remote from the intermediate hologram original plate 31 at the time of recording, and illuminating light 6' is made incident on the intermediate hologram original plate 31 through the volume hologram photosensitive material 32 from a direction opposite to the direction of incidence of the illuminating light 12 at the time of making the intermediate hologram original plate 31 shown in FIG. 5(*a*). Consequently, an image I of the three-dimensional object O (an image of only the front of the object O) is formed at the position of the object O at the time of recording the intermediate reflection hologram 31 by reflected and diffracted light 7' from the intermediate hologram original plate 31. The diffracted light 7' forming the image I of the object O and the incident light (illuminating light) 6' interfere with each other in the volume hologram photosensitive material 32, whereby another reflection type volume hologram is recorded in the volume hologram photosensitive material 32. This reflection type volume hologram is used as a reflection type volume hologram original plate 1 (see FIG. 6). When illuminating light 6 is made incident on the reflection type volume hologram original plate 1, as shown in FIG. 5(*c*), from a direction opposite to the direction of incidence of the illuminating light 6' at the time of recording shown in FIG. 5(*b*), reflected and diffracted light 7 from the reflection type volume hologram original plate 1 reconstructs an image I' of the image I of the object O (an image of only the front of the object O), that is, the image I' of the object O, at the position of the image I. In this case, however, the front surface of the image I' of the object O faces away from the reflection type volume hologram original plate 1.

Figure 6:
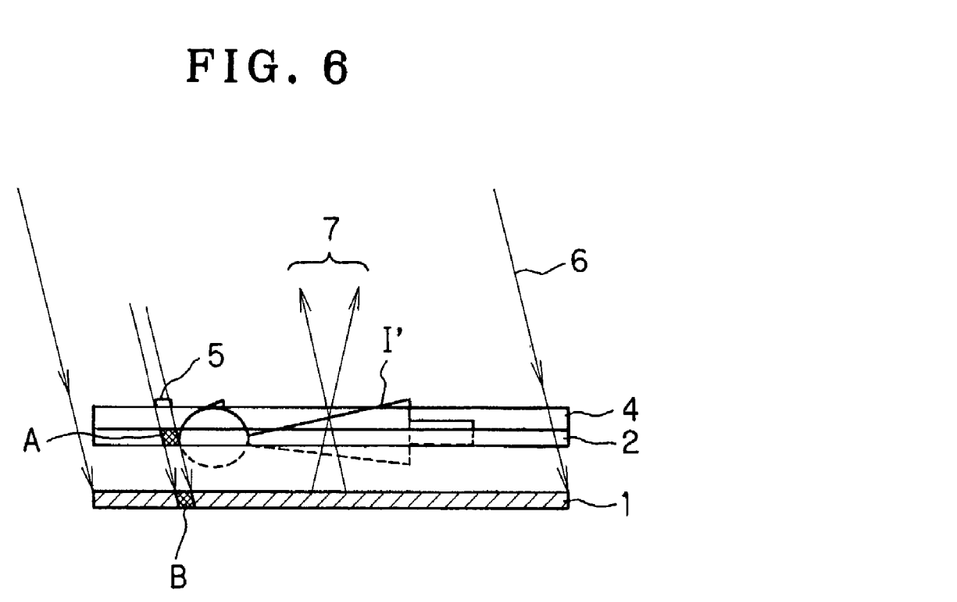
FIG. 6 is a diagram showing an optical path when a reflection type volume hologram original plate recorded by the setup as shown in FIG. 5 is duplicated, together with variable information, by the setup as shown in FIG. 1.

By using such a reflection type volume hologram original plate 1, a reflection type volume hologram having approximately the same characteristics as those of the reflection type volume hologram original plate 1 is duplicatively recorded by a setup as shown in FIG. 6, which is similar to that shown in FIG. 3, and at the same time, variable information 5 on a transparent protective sheet 4 is holographically recorded in a superimposed manner. It should be noted, however, that the setup shown in FIG. 6 is upside-down in relation to the setup shown in FIG. 3; it is the same as that shown in FIG. 1. In FIG. 6, illustration of the transparent plate 3 is omitted as in the case of FIG. 3.

In FIG. 6, when duplicating illuminating light 6 is made incident on the reflection type volume hologram original plate 1 through the transparent protective sheet 4 and the volume hologram photosensitive material 2 from a direction opposite to the direction of incidence of the illuminating light 6' at the time of making the reflection type volume hologram original plate 1 shown in FIG. 5(*b*), reflected and diffracted light 7 from the reflection type volume hologram original plate 1 forms an image I' of the object O (an image of the front of the object O) at the position of the image I of the object O at the time of recording the reflection type volume hologram original plate 1. The diffracted light 7 forming the image I' of the object O and the incident light (duplicating illuminating light) 6 interfere with each other in the volume hologram photosensitive material 2, whereby a reflection type volume hologram having approximately the same characteristics as those of the reflection type volume hologram original plate 1 are duplicatively recorded.

Assuming that the variable information 5 on the transparent protective sheet 4 has been recorded with a transparent ink that transmits only red light, for example, (it is a matter of course that the variable information 5 may be formed to transmit light of other color or may be black so as not to transmit color), only red light in the illuminating light 6 passes through the portion containing the variable information 5. Hence, only the red light in the illuminating light 6 is incident on a region A of the volume hologram photosensitive material 2 that is shadowed by the variable information 5 and also incident on a region B of the reflection type volume hologram original plate 1 that is shadowed by the variable information 5. Not only red light but also green light and blue light are usually incident on the other regions of the volume hologram photosensitive material 2 and the reflection type volume hologram original plate 1. Accordingly, only red light is diffracted from the region B of the reflection type volume hologram original plate 1, and only interference fringes of red light are recorded in the region A of the volume hologram photosensitive material 2. In contrast, ordinary red, green and blue light forming the image I is diffracted from the regions other than the region B of reflection type volume hologram original plate 1. Interference fringes of ordinary red, green and blue light forming the image I are recorded in the regions other than the region A of the volume hologram photosensitive material 2.

Figure 7:
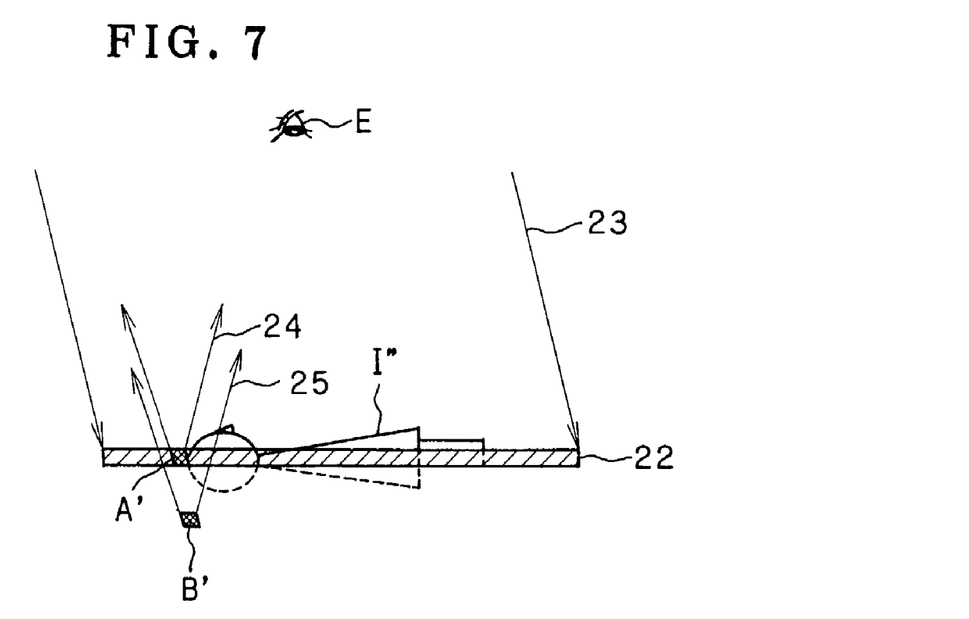
FIG. 7 is a diagram showing an optical path when a recorded image is reconstructed from a volume hologram duplicatively recorded by the setup as shown in FIG. 6.

FIG. 7 is a diagram showing an optical path when a recorded image is reconstructed from a volume hologram 22 duplicatively recorded in the volume hologram photosensitive material 2 as illustrated in FIG. 6 (FIG. 1). White illuminating light 23 is made incident on the volume hologram 22 from the same direction as the direction of incidence of the duplicating illuminating light 6 at the time of the duplicative recording (in the case of FIG. 4, the illuminating light 23 is made incident from a direction opposite to the incident direction of the duplicating illuminating light 6). Consequently, diffracted light reconstructs an image I'' of the image I' of the image I of the three-dimensional object O (an image of only the front of the object O) in the vicinity of the plane of the volume hologram 22. In addition, because only interference fringes of red light have been recorded in a region A' of the volume hologram 22 corresponding to the region A shown in FIG. 6, the region A', which has the same pattern as that of the variable information 5, diffracts only red diffracted light 24. The diffracted light 24 is seen to an observer's eye E as a red first additional information pattern A'. On the other hand, only an extension of red diffracted light from the volume hologram 22 enters a space region B' behind the volume hologram 22 (in the case of FIG. 4, the space region B' lies in front of the volume hologram 22), which corresponds to the region B of the reflection type volume hologram original plate 1 shown in FIG. 6. This is equivalent to the state where only red diffracted light 25 emerges from the space region B', which has the same pattern as that of the variable information 5. Therefore, the diffracted light 25 is seen to the observer's eye E as a red second additional information pattern B'. The first and second additional information patterns A' and B' of the same color are seen to be spatially fixed. Therefore, the relative positions of the two additional information patterns A' and B' change as the eye E moves.

The hologram recording film with additional information shown in FIG. 4 and that shown in FIG. 7 differ from each other in whether the position of the additional information pattern B' reconstructed away from the hologram plane is in front of (FIG. 4) or behind (FIG. 7) the hologram plane. However, the reconstructed images I' and I" of the three-dimensional object O are the same. In either case, the first additional information pattern A' is reconstructed in the hologram plane.

Although in the foregoing description the variable information 5 transmits only red light, it should be noted that the variable information 5 may be formed to transmit other single-color light or a plurality of colors of light. Alternatively, the variable information 5 may be black so as not to transmit color. Regarding the color of the additional information patterns A' and B', these patterns are not always reconstructed with the same color as that of the light transmitted through the variable information 5 when there is no corresponding color in the background at the position where the additional information patterns A' and B' are reconstructed. This tendency is particularly likely to be manifested in the first additional information pattern A'.

The variable information 5, e.g. a serial number, may be previously written on the surface of the transparent protective sheet 4 of the volume hologram photosensitive material 2 by using a laser marker, an inkjet printer, sublimation transfer, printing, etc. before the volume hologram photosensitive material 2 is laminated on the transparent plate 3 in the setup shown in FIG. 1. It is also possible to write the variable information 5 on the surface of the transparent protective sheet 4 by using the above-mentioned writing means after the volume hologram photosensitive material 2 has been laminated on the transparent plate 3 and before the above-described duplicative recording process.

Although the hologram recording film and the recording method therefor according to the present invention have been described above on the basis of embodiments thereof, the present invention is not limited to the foregoing embodiments but can be modified in a variety of ways. It should be noted that the additional information pattern A' according to the present invention exhibits excellent visibility and does not look blurred even under a fluorescent light because the image has been recorded on the hologram photosensitive material surface, whereas the additional information pattern B' may suffer poor visibility and become a blurred image under a fluorescent light, depending on the thickness of the transparent plate 3 in FIG. 1, because the additional information pattern B' is an image seen at a position above or below the hologram photosensitive material surface. Under a spotlight, however, the additional information pattern B' can be obtained as a latent image of excellent visibility.

As will be clear from the foregoing description, the hologram recording film with additional information and the recording method therefor according to the present invention provide a blur-free and bright hologram having excellent visibility and exhibiting a superior graphical design function and high expressional capability because pieces of plane additional information of the same pattern have been recorded so that the pieces of plane additional information can be reconstructed simultaneously in the hologram plane and in front of or behind the hologram plane, respectively, in superimposition with a reconstructed image from a volume hologram. The present invention allows different additional information to be recorded in a superimposed manner for each hologram as individual information without the need of revising the original plate and with a simple setup requiring no special change in the setup used for the conventional hologram duplicating method and no special equipment, without the need of a special additional step for the recording process.

What is claimed is:

1. A hologram recording film comprising:
a photosensitive material; wherein:
a duplicative hologram duplicated from a hologram recorded in a volume hologram original plate is recorded in said photosensitive material;
a first information pattern is recorded in said photosensitive material;
a second information pattern is recorded in said photosensitive material in superposition with said first information pattern, wherein said second information pattern is a hologram of a shadow of said first information pattern that is incident on said volume hologram original plate;
an image of said first information pattern and an image of said second information pattern are simultaneously reconstructed in superimposition, along with an image reconstructed from said duplicative hologram, by illuminating said hologram recording film with white illuminating light, and
when said images are reconstructed, said image of said first information pattern is located in an image plane of said reconstructed image of said duplicative hologram, and said image of said second information pattern is located in front of or behind said image plane.

2. The hologram recording film according to claim 1, wherein said duplicative hologram is recorded with a single wavelength.

3. The hologram recording film according to claim 2, wherein said image of said first information pattern and said image of said second information pattern are reconstructed as a color pattern.

4. The hologram recording film according to claim 1, wherein said image of said first information pattern and said image of said second information pattern are reconstructed as a color pattern.

5. The hologram recording film according to any one of claims 1 to 4, wherein said image of said first information pattern and said image of said second information pattern are reconstructed in a single color.

6. The hologram recording film according to claim 1, wherein said duplicative hologram is a composite hologram recorded with at least two wavelengths.

7. A method for recording a hologram of an object and additional information in a hologram recording film, said method comprising:
recording said hologram of said object in a volume hologram original plate;
writing said additional information on a first surface of a transparent sheet, wherein a second surface of said transparent sheet is opposite to said first surface, and is mounted on a photosensitive material;
positioning said photosensitive material between a light source and said volume hologram original plate;
illuminating said transparent sheet with duplicating illuminating light, wherein said additional information blocks at least some of said duplicating illuminating light such that a shadow of said additional information is recorded as a first information pattern in said photosensitive material, and a shadow of said first information pattern is incident on said volume hologram original plate;

forming an image of said object by reflected and diffracted light from said volume hologram original plate; and interfering said reflected and diffracted light with said duplicating illuminating light in said photosensitive material such that a duplicative hologram of said object is recorded in said photosensitive material and a second information pattern is recorded in said photosensitive material in superposition with said first information pattern, wherein said second information pattern is a hologram of said shadow of said first information pattern that is incident on said volume hologram original plate.

8. The recording method according to claim 7, wherein said transparent sheet is a transparent protective sheet for protecting said photosensitive material, and said information is recorded on said transparent protective sheet by using a laser marker, an ink-jet printer, sublimation transfer, a laser printer, or an electrophotographic printing system.

9. A method for recording a hologram of an object and additional information in a hologram recording film, and for reconstructing an image of said hologram and said additional information, said method comprising:

recording said hologram of said object in a volume hologram original plate;

writing said additional information on a first surface of a transparent sheet, wherein a second surface of said transparent sheet is opposite to said first surface, and is mounted on a photosensitive material;

positioning said photosensitive material between a light source and said volume hologram original plate;

illuminating said transparent sheet with duplicating illuminating light, wherein said additional information blocks at least some of said duplicating illuminating light such that a shadow of said additional information is recorded as a first information pattern in said photosensitive material, and a shadow of said first information pattern is incident on said volume hologram original plate;

forming an image of said object by reflected and diffracted light from said volume hologram original plate;

interfering said reflected and diffracted light with said duplicating illuminating light in said photosensitive material such that a duplicative hologram of said object is recorded in said photosensitive material and a second information pattern in said is recorded in said photosensitive material in superposition with said first information pattern, wherein said second information pattern is a hologram of said shadow of said first information pattern that is incident on said volume hologram original plate; and reconstructing an image of said duplicative hologram, an image of said first information pattern, and an image of said second information pattern by illuminating said hologram recording film with white illuminating light, wherein:

said image of said first information pattern and said image of said second information pattern are superimposed with each other and with said image of said duplicative hologram, said image of said first information pattern is formed in an image plane of said image of said duplicative hologram, and said image of said second information pattern is formed in front of or behind said image plane of said duplicative hologram.

10. The method according to claim 9, wherein said transparent sheet is a transparent protective sheet for protecting said photosensitive material, and said information is recorded on said transparent protective sheet by using a laser marker, an ink-jet printer, sublimation transfer, a laser printer, or an electrophotographic printing system.

11. The method according to claim 9, wherein said white illuminating light and said duplicating illuminating light illuminate said photosensitive material from opposite directions.

12. The method according to claim 9, wherein said white illuminating light and said duplicating illuminating light illuminate said photosensitive material from a same direction.

* * * * *